May 23, 1939.  A. M. WRIGHT  2,159,721
GUIDING AND BACKING MEANS FOR AUTOMOBILE TRAILERS
Filed March 22, 1937  3 Sheets-Sheet 2
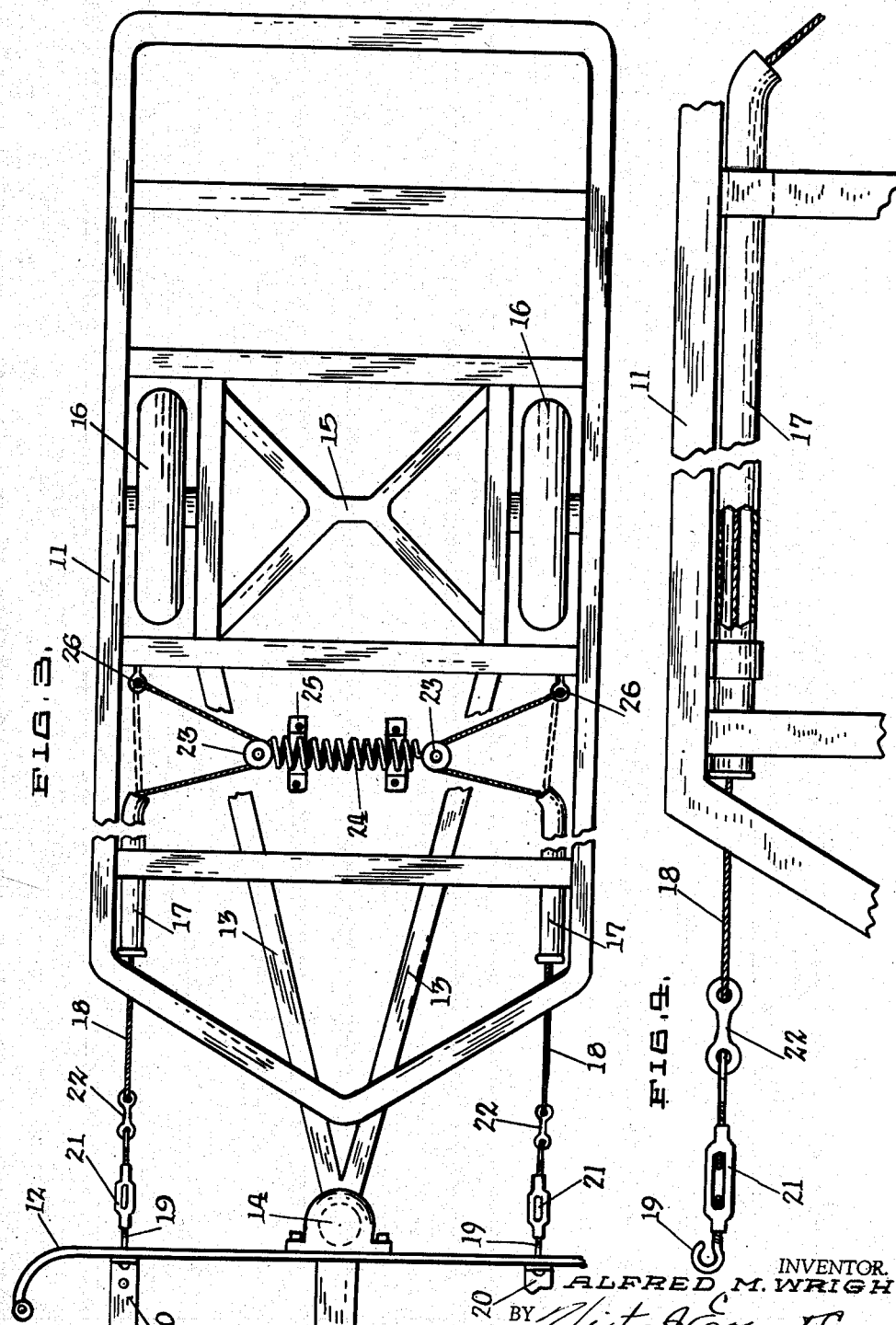
INVENTOR.
ALFRED M. WRIGHT.
BY
ATTORNEYS.

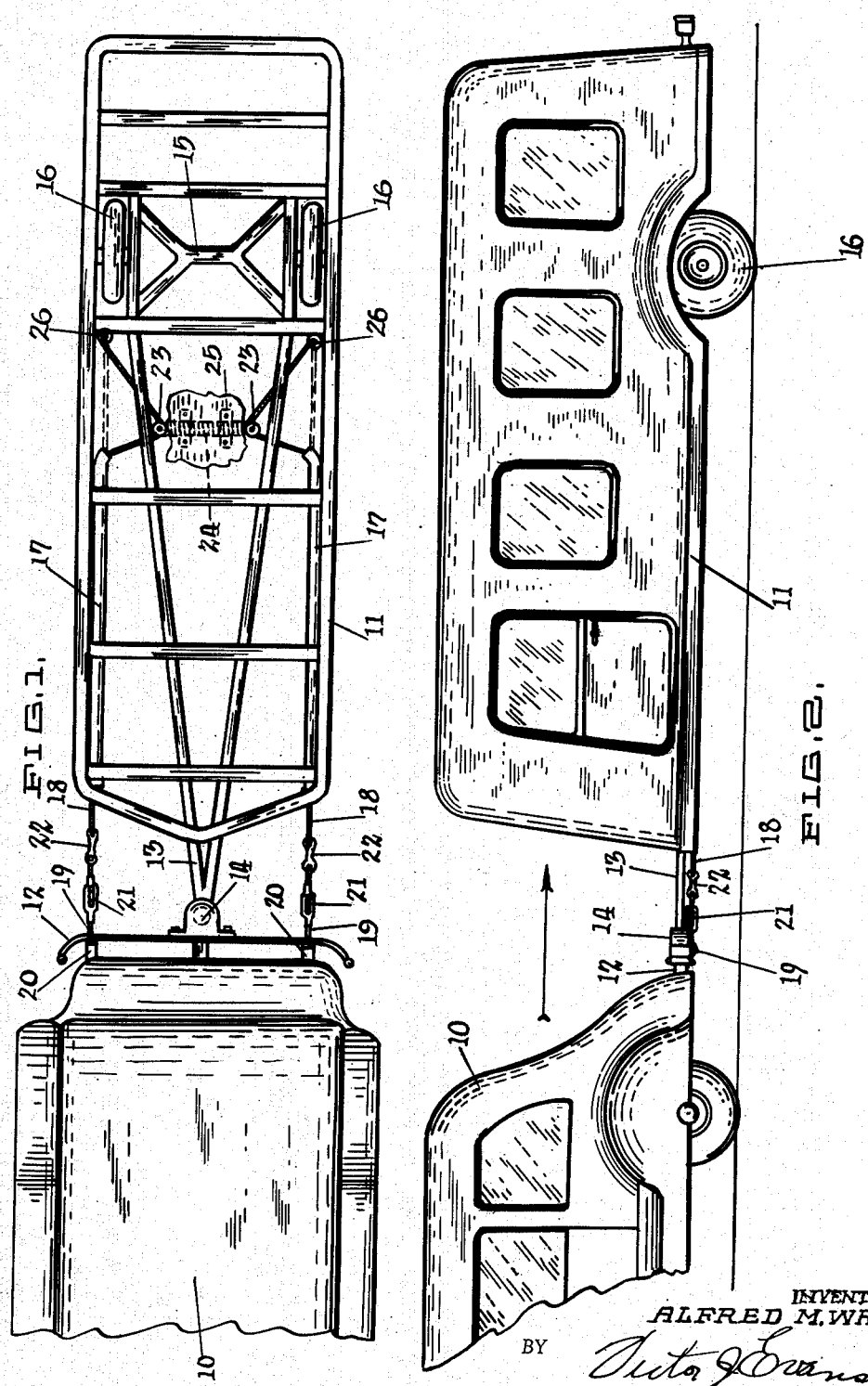

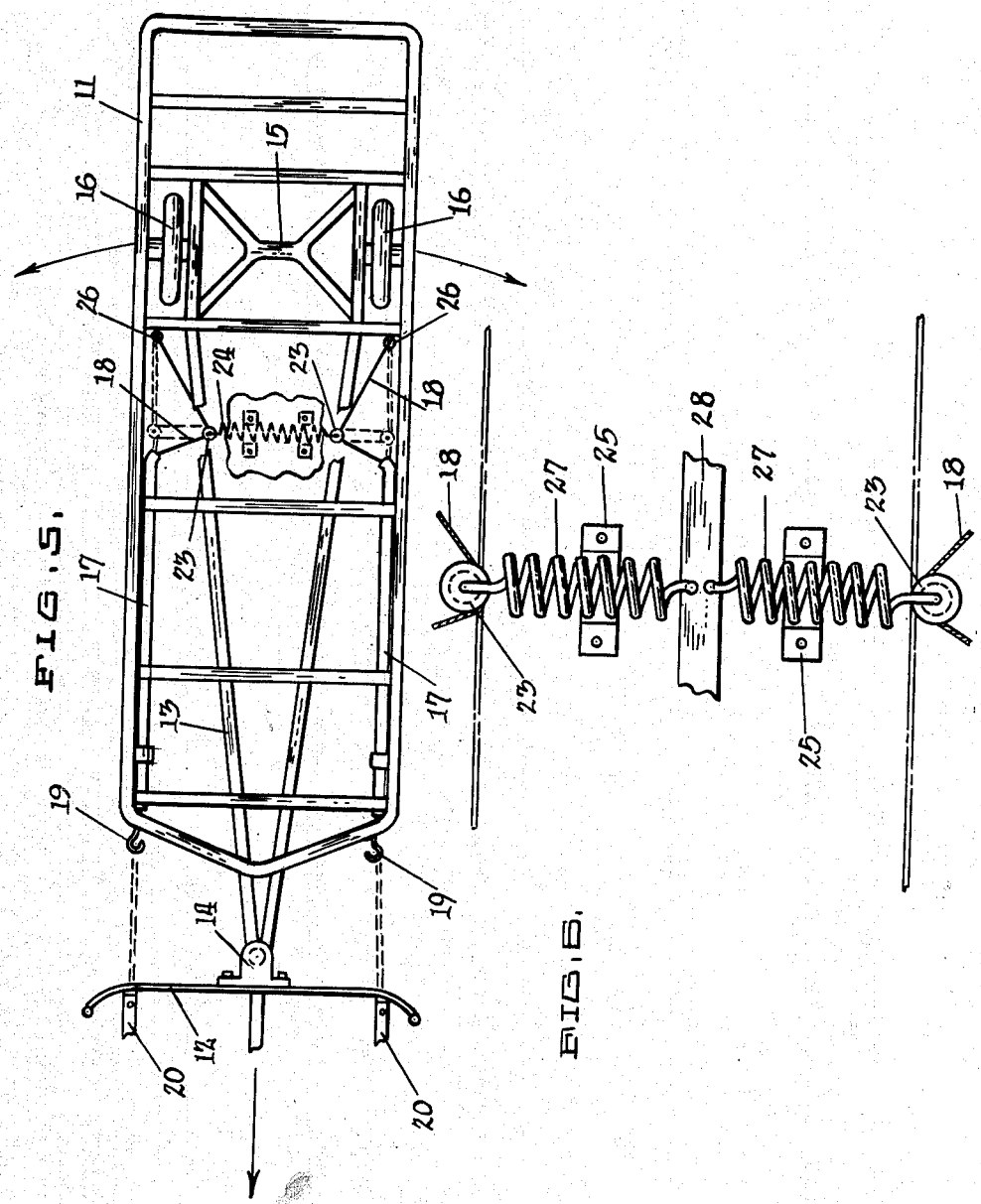

Patented May 23, 1939

2,159,721

UNITED STATES PATENT OFFICE 2,159,721

GUIDING AND BACKING MEANS FOR AUTOMOBILE TRAILERS

Alfred M. Wright, Oakland, Calif.

Application March 22, 1937, Serial No. 132,414

1 Claim. (Cl. 280—33.5)

This invention relates broadly to improvements in guiding and backing means for automobile trailers and has particular reference to a novel mechanism that may be attached to the rear end of a motor vehicle, either to the rear bumper or any other suitable section thereof to provide a draft mechanism for the trailer and to also act as a means to hold the trailer in fixed longitudinal alignment with the vehicle when it is desired to reverse and back the trailer when attached to said vehicle.

The principal object of the invention is to provide a guiding and backing mechanism for trailers which is positive in action, which may be readily attached to any make of motor vehicle, and one which will hold the trailer in true alignment when it is desired to back both vehicles, for instance, in parking or garaging the trailer.

Another object of the invention is to provide a novel combined hitch and backing means for combined power vehicles and trailers and one that is durable, is simple to attach for backing purposes, and greatly facilitates the handling of said combined vehicles.

A further object of the invention is to provide a device of the character set forth that employs flexible spring urged connections for the backing of the trailer which may be quickly and easily disconnected from the draft vehicle when not in use.

A still further object of the invention is to provide means of this character that will automatically be retracted below the frame of the trailer and into tubular members positioned along both sides of the trailer frame.

Other objects and advantages will be apparent during the course of the following description.

In the accompanying drawings forming a part of this specification and in which like numerals are employed to designate like parts throughout the same, Fig. 1 is a plan view showing a draft vehicle connected to a trailer chassis or frame and illustrating the preferred form of my guiding and backing mechanism, the same being shown in operative position for backing the trailer;

Fig. 2 is a side elevation of the combined vehicles further illustrating the connecting mechanism;

Fig. 3 is an enlarged plan view of the trailer frame and connecting mechanism with the draft vehicle omitted;

Fig. 4 is an enlarged fragmentary plan view, further illustrating the flexible connections and the tubular guides for the same;

Fig. 5 is a plan view of the trailer frame with the guiding mechanism retracted as when out of use; and Fig. 6 is a view further illustrating the cable connections and spring retracting mechanism of a somewhat modified form.

In the accompanying drawings wherein for the purpose of illustration is shown a preferred embodiment of my invention and referring particularly to Figs. 1 and 2 of the said drawings, it will be observed that a draft vehicle 10 has been illustrated with a trailer 11 attached thereto and in this instance the trailer is shown connected to the rear bumper 12 by means of a suitable hitch 13 pivoted at the point 14 and branching rearwardly and connected to a suitable cross brace 15 of the trailer chassis. The trailer, of course, may be of any suitable type and may be mounted upon the usual wheels 16, as shown. It is quite obvious that a combined draft vehicle and trailer connected to the rear thereof is a very awkward combination to back up for any purpose, as the idler wheels of the trailer will not track in alignment with the draft vehicle wheels and naturally will run off at a tangent. It is, therefore, the purpose of the present invention to provide means for overcoming this fault, the mechanism of which, while simple in arrangement and combination of parts, is positive in its action, may be quickly attached and detached, and will not in any manner affect the operation of the vehicles when travelling along the highway in the usual manner.

For accomplishing the purpose set forth, I provide the trailer frame 11 with tubular elements 17 having cables or like flexible elements 18 arranged therein and provided with suitable attaching hooks 19 which may be hooked into the bumper supports 20. Attached to the hooks 19, turn buckles 21 may also be provided and also swivel members 22, so that the flexible connections 18 may be properly adjusted. It will further be noted that intermediate sections of said cables are reeved through pulleys 23 carried by a spring member 24 suitably mounted below the trailer chassis by brackets or the like 25, the free ends of said connections 18 being held by eyelets 26 mounted in the frame.

The normal hook-up for backing purposes is shown in Figs. 1 and 3. In Fig. 5 I have illustrated the connections 18 released and retracted into the tubular members 17 for travelling in the usual manner. It is, of course, to be understood that the spring 24 maintains tension on the flexible connections 18 and tends to retract the same when the hooks 19 are released from the draft vehicle, as in Fig. 5. A constant tension is, therefore, maintained on the cables 18, and these are placed adjacent opposite side frames of the trailer, which tends to maintain the trailer and trailer frame in alignment with the vehicle when backing the two vehicles.

In Fig. 6 a slightly modified form of spring arrangement is illustrated in which two opposed springs 27 have been shown connected to a bar 28, which bar may be a part of the chassis frame 11 of the trailer.

It is, therefore, obvious that a trailer mechanism constructed in accordance with the present invention may be readily backed and easily and expeditiously handled through the medium of the flexible connections, the spring element and the connecting hooks 19 of the device, and when the trailer is properly backed to position, these connections will immediately be retracted when the hooks are released.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

Means for maintaining in alignment and guiding a trailer chassis relative to a draft vehicle when being backed comprising a transversely arranged spring equalizing and retracting member carried by the trailer chassis, spaced flexible connections having sections thereof associated with said equalizing member and certain ends thereof connected to the draft vehicle, thereby producing an equalized pull on the trailer chassis to guide the same rearwardly and to track directly behind the draft vehicle, and tubular guide members arranged on opposite sides of said trailer chassis and capable of retaining said flexible connections in spaced relation.

ALFRED M. WRIGHT.